(12) United States Patent
Orita

(10) Patent No.: US 9,308,654 B2
(45) Date of Patent: Apr. 12, 2016

(54) CONTROL DEVICE FOR LINK MECHANISM

(71) Applicant: HONDA MOTOR CO., LTD., Tokyo (JP)

(72) Inventor: Atsuo Orita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 419 days.

(21) Appl. No.: 14/068,927

(22) Filed: Oct. 31, 2013

(65) Prior Publication Data

US 2014/0180482 A1 Jun. 26, 2014

(30) Foreign Application Priority Data

Dec. 21, 2012 (JP) ................................. 2012-279307

(51) Int. Cl.
*G05B 13/00* (2006.01)
*B25J 19/06* (2006.01)
*B25J 9/16* (2006.01)

(52) U.S. Cl.
CPC ............... *B25J 19/068* (2013.01); *B25J 9/1635* (2013.01); *G05B 2219/39082* (2013.01); *G05B 2219/39186* (2013.01); *G05B 2219/39342* (2013.01); *G05B 2219/39345* (2013.01)

(58) Field of Classification Search
CPC .................. B25J 19/068; B25J 9/1635; G05B 2219/39345; G05B 2219/39342; G05B 2219/39186; G05B 2219/39082
See application file for complete search history.

(56) References Cited

FOREIGN PATENT DOCUMENTS

JP 2008-302496 12/2008

OTHER PUBLICATIONS

De Luca, Alessandro; Flacco, Fabrizio; Bicchi, Antonio; Schiavi, Riccardo. "Nonlinear Decoupled Motion-Stiffness Control and Collision Detection/Reaction for the VSA-II Variable Stiffness Device", Oct. 11-15, 2009, The 2009 IEEE/RSJ International Conference on Intelligent Robots and Systems, 5487-5494.*

* cited by examiner

*Primary Examiner* — Sean Shechtman
*Assistant Examiner* — David Wynne
(74) *Attorney, Agent, or Firm* — Rankin, Hill & Clark LLP

(57) ABSTRACT

Provided is a control device for a link mechanism capable of preventing a damage of joint mechanisms even in the case of a collision of a movable part against an external object. The control device 30 includes: a characteristic determination unit 34 which determines desired stiffness $k\_cmd\_i$ of an elastic element 5 of each joint mechanism Ji so as to be within a range of first stiffness $k1\_i$ wherein the joint maximum elastic energy is equal to or more than joint collision kinetic energy to second stiffness $k2\_i$ wherein a first time is equal to or longer than a second time; and a characteristic control unit 35 which controls stiffness $k\_i$ of the elastic element 5 of each joint mechanism Ji to be the desired stiffness $k\_cmd\_i$.

7 Claims, 7 Drawing Sheets

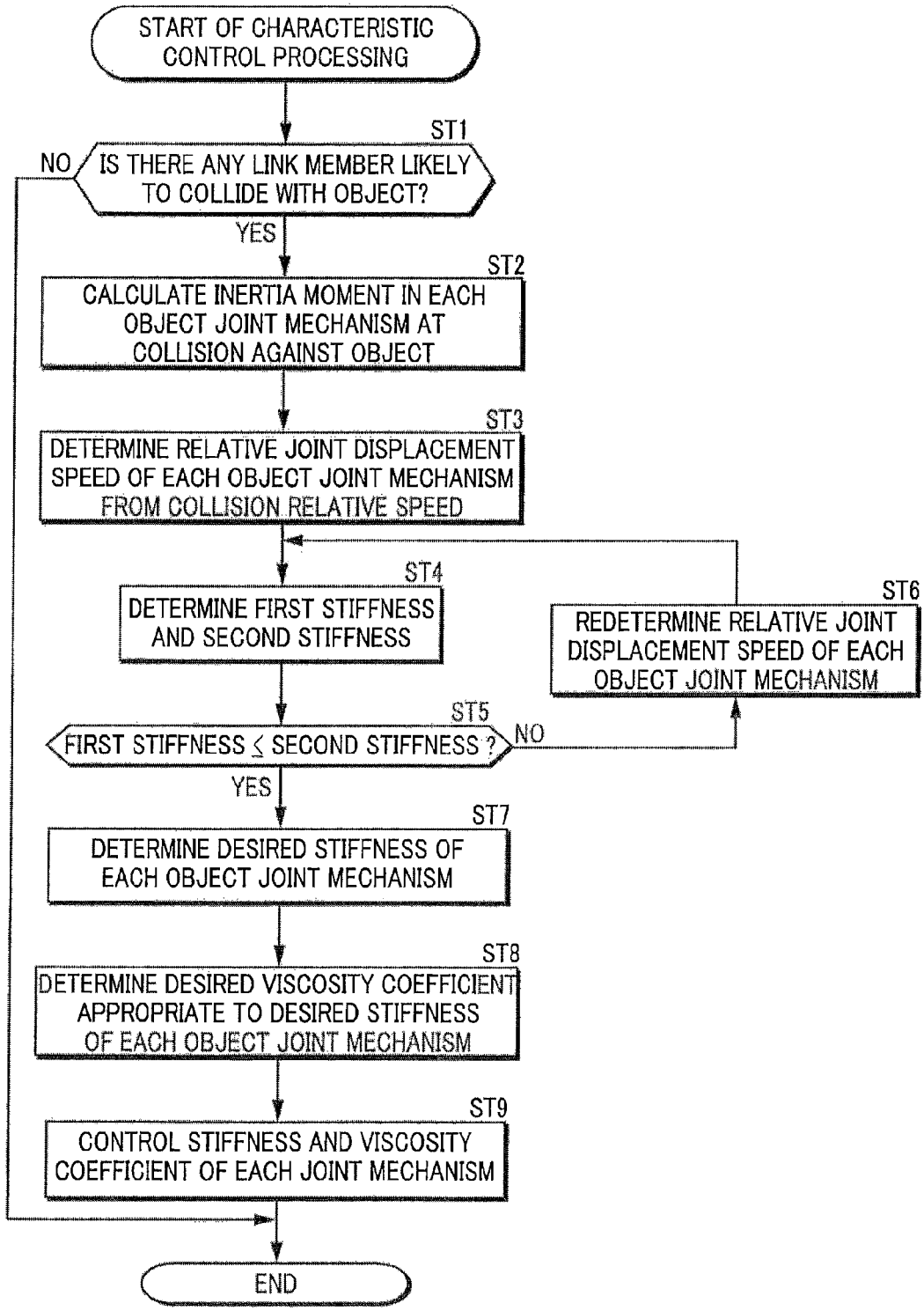

CONTROL DEVICE FOR LINK MECHANISM

BACKGROUND OF THE INVENTION

1. Field of the Invention

The present invention relates to a control device for a link mechanism including one or more joint mechanisms disposed between a base body and a movable part which is movable relative to the base body and an actuator which outputs a driving force for displacing the one or more joint mechanisms, wherein each of the one or more joint mechanisms is adapted to transmit motive power via an elastically-deformable elastic element whose stiffness is variably controllable.

2. Description of the Related Art

Conventionally, there is known a control device for a link mechanism including a plurality of joint mechanisms disposed between a base body and a movable part which is movable relative to the base body and an actuator which outputs a driving force for displacing the plurality of joint mechanisms, wherein each of the plurality of joint mechanisms is adapted to transmit motive power via an elastically-deformable elastic element whose stiffness is variably controllable (Japanese Patent Application Laid-Open No. 2008-302496). The control device for the link mechanism controls the stiffness of the elastic elements of joint mechanisms on the side closer to the base body than the movable part to be smaller than the stiffness of the elastic elements of other joint mechanisms when the movable part collides with an external object.

In the control device for the link mechanism as described in Japanese Patent Application Laid-Open No. 2008-302496, however, the stiffness of the elastic element of each joint mechanism is controlled without considering the kinetic energy or the like of each joint mechanism generated by a collision of the movable part against the object. Consequently, in each joint mechanism, a load larger than a load allowable for the joint mechanism acts on the joint mechanism when the movable part collides with the object, which might damage the joint mechanism.

The present invention has been provided in view of the above problem. Therefore, it is an object of the present invention to provide a control device for a link mechanism including one or more joint mechanisms disposed between a base body and a movable part which is movable relative to the base body and an actuator which outputs a driving force for displacing the one or more joint mechanisms, wherein each of the one or more joint mechanisms is adapted to transmit motive power via an elastically-deformable elastic element whose stiffness is variably controllable, the control device capable of preventing the joint mechanisms from being damaged even in the case where the movable part collides with an external object.

SUMMARY OF THE INVENTION

According to an aspect of the present invention, there is provided a control device for a link mechanism having one or more joint mechanisms provided between a base body and a movable part which is movable relative to the base body and an actuator outputting a driving force for displacing the one or more joint mechanisms, in which each of the one or more joint mechanisms is configured to transmit motive power via an elastically deformable elastic element adapted to have variably controllable stiffness, the control device including: a relative displacement speed determination unit configured to determine a relative displacement speed of each of the one or more joint mechanisms corresponding to a relative speed between the movable part and an external object in a case where the movable part collides with the object; a characteristic determination unit configured to determine a stiffness of the elastic element of each of the one or more joint mechanisms in the case where the movable part collides with the object so that the stiffness is within a range between first stiffness or more and second stiffness or less determined for each of the one or more joint mechanisms; and a characteristic control unit configured to control the stiffness of the elastic element of each of the one or more joint mechanisms in the case where the movable part collides with the object so as to be the stiffness determined by the characteristic determination unit; wherein: the characteristic determination unit determines the first stiffness so that elastic energy of the elastic element of the joint mechanism concerned in a case where an elastic deformation amount of the elastic element of the joint mechanism is a maximum deformation amount of the elastic element of the joint mechanism is equal to or more than kinetic energy of the joint mechanism which is obtained when the joint mechanism is displaced at a displacement speed of the joint mechanism determined by the relative displacement speed determination unit in each of the one or more joint mechanisms; and the characteristic determination unit determines the second stiffness so that a time interval from a time point of starting the displacement of the joint mechanism caused by the collision of the movable part against the object to a time point of starting the displacement of the joint mechanism caused by the elastic energy of the elastic element of the joint mechanism accumulated by the displacement of the joint mechanism caused by the collision is equal to or longer than a minimum time achievable in the joint mechanism in a case of changing the displacement speed of the joint mechanism by a speed obtained by inverting a direction of the relative displacement speed of the joint mechanism determined by the relative displacement speed determination unit by displacing the joint mechanism by using the actuator in each of the one or more joint mechanisms.

In the above, the elastic deformation amount of the elastic element in the present invention means a relative displacement amount between the side from which the motive power is transmitted to the elastic element and the side to which the motive power is transmitted via the elastic element.

According to the present invention, if the stiffness of the elastic element of the joint mechanism is equal to or more than the first stiffness in each of the one or more joint mechanisms, the kinetic energy of the joint mechanism generated by the collision of the movable part against the object is entirely converted to elastic energy accumulated in the elastic element by an elastic deformation of the elastic element of the joint mechanism. Therefore, in this instance, it is possible to prevent the joint mechanism from being damaged by the collision of the movable part against the object.

Moreover, if the stiffness of the elastic element of the joint mechanism is equal to or less than the second stiffness in each of the one or more joint mechanisms, the joint mechanism is displaced by the actuator during a time period from a time point of starting the displacement of the joint mechanism caused by the collision of the movable part against the object to a time point of starting the displacement of the joint mechanism caused by the elastic energy of the elastic element of the joint mechanism accumulated by the displacement of the joint mechanism caused by the collision (specifically, a time point when the release of the elastic energy is started) (in other words, a duration in which the kinetic energy of the joint mechanism generated by the collision of the movable part against the object is converted to the elastic energy of the elastic element of the object joint mechanism), thereby enabling the displacement speed of the joint mechanism to be changed by a speed obtained by inverting the direction of the relative displacement speed of the joint mechanism determined by the relative displacement speed determination unit. Therefore, in this instance, it is possible to prevent the joint mechanism from being forcibly displaced by the elastic energy of the elastic element of the joint mechanism. Thereby, the joint mechanism is able to be prevented from being damaged by the collision of the movable part against the object.

The characteristic determination unit determines the stiffness of the elastic element of the joint mechanism so as to be within the range between the first stiffness or more and the second stiffness or less as described above and the characteristic control unit controls the stiffness of the elastic element of the joint mechanism in the case where the movable part collides with the object so as to achieve the determined stiffness in each of the one or more joint mechanisms, thereby preventing the damage of the joint mechanisms caused by the collision of the movable part against the object.

In the present invention, preferably, if an arbitrary joint mechanism among the one or more joint mechanisms is defined as an i-th joint mechanism, the characteristic determination unit determines the first stiffness of the elastic element of the i-th joint mechanism so as to be equal to or more than stiffness obtained according to the following expression (1):

[MATH. 1]

$$I\_t\_i \cdot \left(\frac{\Delta\omega\_i}{x\_lim\_i}\right)^2 \quad (1)$$

where, in the expression (1), $I\_t\_i$ indicates an inertia moment or an inertial mass in a case of displacing the i-th joint mechanism in the case where the movable part collides with the object. In addition, $I\_t\_i$ is an inertia moment if the i-th joint mechanism is a rotary joint mechanism and is an inertial mass if the i-th joint mechanism is a linear motion joint mechanism. Moreover, $\Delta\omega\_i$ indicates a relative displacement speed of the i-th joint mechanism determined by the relative displacement speed determination unit. Further, $x\_lim\_i$ indicates a maximum deformation amount of the elastic element of the i-th joint mechanism.

In this regard, when the stiffness of the elastic element of the i-th joint mechanism is defined as $k\_i$, the expression (1) is $k\_i$ satisfying the following expression (1-1):

[MATH. 2]

$$\frac{1}{2}I\_t\_i \cdot \Delta\omega\_i^2 = \frac{1}{2}k\_i \cdot x\_lim\_i^2 \quad (1-1)$$

In the expression (1-1), the left-hand side represents the kinetic energy of the i-th joint mechanism in the case where the movable part collides with the object (hereinafter, the kinetic energy is referred to as "joint collision kinetic energy"). Moreover, the right-hand side represents the elastic energy of the elastic element of the i-th joint mechanism in the case where the elastic deformation amount of the elastic element of the i-th joint mechanism is the maximum deformation amount of the elastic element of the i-th joint mechanism when $k\_i$ is the stiffness of the elastic element of the i-th joint mechanism (the elastic energy is referred to as "joint maximum elastic energy").

Setting the first stiffness of the i-th joint mechanism to a value equal to or more than the stiffness obtained according to the expression (1) means that the joint maximum elastic energy in the right-hand side is equal to or more than the joint collision kinetic energy in the left-hand side in the expression (1-1), in other words, all of the joint collision kinetic energy is converted to the joint maximum elastic energy. Therefore, the setting of the first stiffness to the value equal to or more than the stiffness obtained according to the expression (1) prevents the i-th joint mechanism from being damaged by the collision of the movable part against the object.

In the present invention, preferably, with an arbitrary joint mechanism among the one or more joint mechanisms defined as the i-th joint mechanism, the characteristic determination unit determines the second stiffness of the elastic element of the i-th joint mechanism so as to be equal to or less than stiffness obtained according to the following expression (2):

[MATH. 3]

$$I\_t\_i \cdot \left(\frac{\pi \cdot A\_max\_i}{2 \cdot \Delta\omega\_i}\right)^2 \quad (2)$$

where, in the expression (2), $I\_t\_i$ indicates an inertia moment or an inertial mass in a case of displacing the i-th joint mechanism in the case where the movable part collides with the object. In addition, $I\_t\_i$ is an inertia moment if the i-th joint mechanism is a rotary joint mechanism and is an inertial mass if the i-th joint mechanism is a linear motion joint mechanism. Moreover, $\pi$ indicates a circular constant, and $A\_max\_i$ indicates a maximum acceleration achievable in the i-th joint mechanism in the case of displacing the i-th joint mechanism by using the actuator. Further, $\Delta\omega\_$ incidates a relative displacement speed of the i-th joint mechanism determined by the relative displacement speed determination unit.

In this regard, when the stiffness of the elastic element of the i-th joint mechanism is defined as $k\_i$, the expression (1) is $k\_i$ satisfying the following expression (2-1):

[MATH. 4]

$$\frac{\pi}{2}\sqrt{\frac{I\_t\_i}{k\_i}} = \frac{\Delta\omega\_i}{A\_max\_i} \quad (2-1)$$

In the expression (2-1), the left-hand side represents a quarter of the period represented by an inverse of a natural frequency of the elastic element of the i-th joint mechanism when $k\_i$ is the stiffness of the elastic element of the i-th joint mechanism. Specifically, the left-hand side represents a time interval from a time point of starting the displacement of the i-th joint mechanism caused by the collision of the movable part against the object to a time point of starting the displacement of the i-th joint mechanism caused by elastic energy of the elastic element of the i-th joint mechanism accumulated by the displacement of the i-th joint mechanism caused by the collision.

Moreover, the right-hand side represents a time period (the minimum time achievable in the i-th joint mechanism) required in the case of changing the displacement speed of the i-th joint mechanism by a speed obtained by inverting the direction of the relative displacement speed of the i-th joint mechanism determined by the relative displacement speed determination unit when displacing the i-th joint mechanism by using the actuator at the maximum acceleration achievable in the i-th joint mechanism.

Setting the second stiffness of the i-th joint mechanism to a value equal to or less than the stiffness obtained according to the expression (2) means that it is possible to place the i-th joint mechanism in a state where the i-th joint mechanism is prevented from being forcibly displaced by the elastic energy of the elastic element of the i-th joint mechanism by displacing the i-th joint mechanism by using the actuator during a time period in which the time in the right-hand side is equal to or less than the time in the left-hand side, in other words, the kinetic energy of the i-th joint mechanism generated by the collision of the movable part against the object is converted to the elastic energy of the elastic element of the i-th joint mechanism. This prevents the damage of the i-th joint mechanism caused by the collision of the movable part against the object.

In the present invention, preferably the characteristic determination unit determines the stiffness of the elastic element smaller as the joint mechanism is closer to the movable part. Thereby, the stiffness set to a small value facilitates the movement of the joint mechanism closer to the movable part. When each joint mechanism is displaced according to the displacement of the movable part caused by the collision of the movable part against the object, the joint mechanism closer to the movable part is able to move more easily and thus the displacement of the joint mechanism closer to the base body can be reduced. Therefore, it is possible to reduce the influence on the base body at the time of collision of the movable part against the object.

In the present invention, when the characteristic determination unit determines the first stiffness and the second stiffness of each of the one or more joint mechanisms, there can be a marginal joint mechanism which is a joint mechanism in which the first stiffness is greater than the second stiffness among the one or more joint mechanisms in some cases.

In this instance, assuming that the stiffness of the elastic element of the marginal joint mechanism is equal to the second stiffness, preferably the relative displacement speed determination unit redetermines a change amount in displacement speed of the marginal joint mechanism in the case of displacing the marginal joint mechanism at the maximum acceleration achievable in the marginal joint mechanism by using the actuator, during a time period from a time point of starting the displacement of the marginal joint mechanism caused by the collision of the movable part against the object to a time point of starting the displacement of the marginal joint mechanism caused by the elastic energy of the elastic element of the marginal joint mechanism accumulated by the displacement of the marginal joint mechanism caused by the collision, as a relative displacement speed of the marginal joint mechanism and redetermines the relative displacement speed of the joint mechanism so as to be higher than the currently-determined relative displacement speed of the joint mechanism in each of the joint mechanisms other than the marginal joint mechanism among the one or more joint mechanisms; and the characteristic determination unit redetermines the first stiffness and the second stiffness based on the displacement speed redetermined by the relative displacement speed determination unit in each of the one or more joint mechanisms.

In order to enable all of the kinetic energy of the marginal joint mechanism generated by the collision to be converted to the elastic energy of the elastic element of the marginal joint mechanism even if the stiffness of the elastic element of the marginal joint mechanism is the second stiffness smaller than the first stiffness, the displacement speed of the marginal joint mechanism needs to be smaller. In addition, in order to prevent the change in displacement speed of the movable part in the case where the movable part collides with the object, it is necessary to increase the displacement speed of joint mechanisms other than the marginal joint mechanism.

Therefore, the relative displacement speed determination unit redetermines, as a relative displacement speed of the marginal joint mechanism, a change amount in the displacement speed of the marginal joint mechanism displaced by the actuator at the maximum acceleration achievable by the marginal joint mechanism during a time period from a time point of starting the displacement of the marginal joint mechanism caused by the collision of the movable part against the object to a time point of starting the displacement of the marginal joint mechanism caused by elastic energy of the elastic element of the marginal joint mechanism accumulated by the displacement of the marginal joint mechanism caused by the collision.

Furthermore, the relative displacement speed determination unit redetermines the relative displacement speed of the joint mechanism so as to be higher than the relative displacement speed of the joint mechanism before the redetermination thereof in each of the joint mechanisms other than the marginal joint mechanism among the one or more joint mechanisms in order to prevent a change in the displacement speed of the movable part in the case of the collision of the movable part against the object. In addition, the characteristic determination unit redetermines the first stiffness and the second stiffness according to the redetermined relative displacement speed.

In this manner, the decrease in the displacement speed of the marginal joint mechanism is compensated by an increase in the displacement speed of the joint mechanism other than the marginal joint mechanism. This prevents the marginal joint mechanism from being displaced at a displacement speed impermissible for the marginal joint mechanism, thereby preventing the damage of the marginal joint mechanism.

In the present invention, preferably the characteristic determination unit redetermines the stiffness of the elastic element of the joint mechanism other than the marginal joint mechanism among the one or more joint mechanisms so that the stiffness of the elastic element of the joint mechanism closer to the movable part than the marginal joint mechanism is smaller than the stiffness of the elastic element of the joint mechanism closer to the base body than the marginal joint mechanism. Thereby, the joint mechanism closer to the movable part than the marginal joint mechanism is able to move more easily, thus enabling a reduction in influence of the collision of the movable part against the object on the marginal joint mechanism.

In the present invention, preferably each of the one or more joint mechanisms is configured to transmit motive power via the elastic element and a viscous element having a viscous coefficient adapted to be variably controllable by the characteristic control unit, the characteristic determination unit determines the viscosity coefficient of the viscous element of the joint mechanism appropriate to the determined stiffness so that the behavior characteristic of the joint mechanism is a critical damping or overdamping characteristic when determining the stiffness of the elastic element of the joint mechanism in each of the one or more joint mechanisms; and the characteristic control unit controls the viscous coefficient of the viscous element of the joint mechanism so as to be the viscous coefficient determined by the characteristic determination unit in each of the one or more joint mechanisms.

Thereby, the behavior characteristic of each joint mechanism becomes the critical damping or overdamping characteristic and is prevented from being the damped oscillation characteristic. Therefore, the damped oscillation is prevented in each of the one or more joint mechanisms, thereby preventing an occurrence of oscillation of the movable part responsive to the damped oscillation of the joint mechanism. Consequently, it prevents an occurrence of a collision between the movable part and the object caused by the elasticity of the elastic element of each joint mechanism. Thereby, it is possible to prevent a damage of each joint mechanism caused by the collision of the movable part against the object.

BRIEF DESCRIPTION OF THE DRAWINGS

FIG. 7 is a flowchart illustrating the procedure of characteristic control processing of the joint mechanism performed by the control device for the link mechanism according to the embodiment.

DESCRIPTION OF THE PREFERRED EMBODIMENTS (1. Structure)
(1-1. Link Mechanism)

Figure 1:
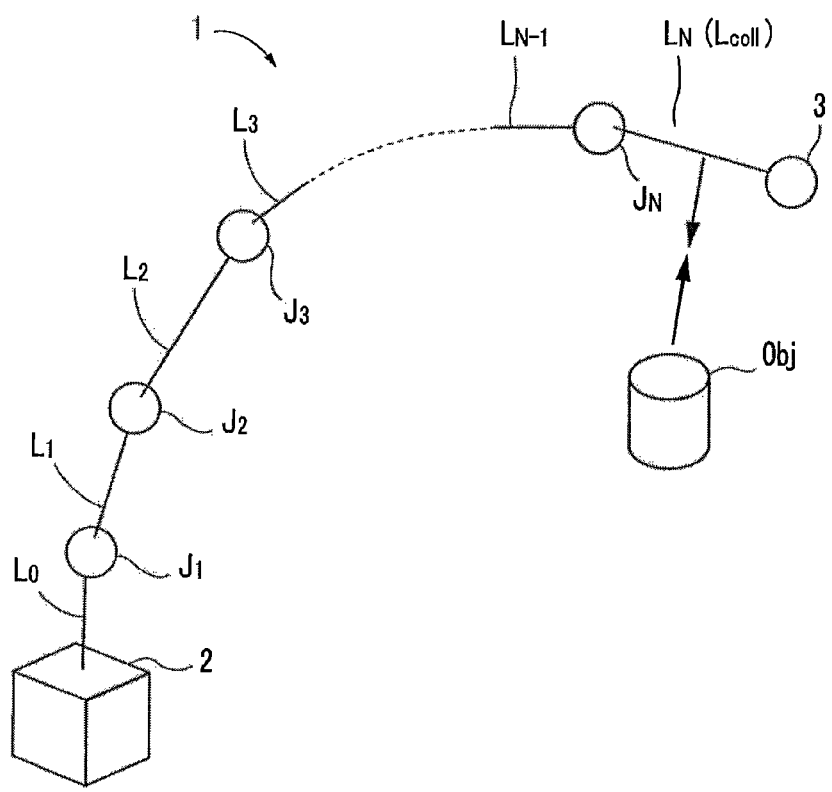
FIG. 1 is a diagram illustrating a link mechanism including a control device according to an embodiment of the present invention.

Referring to FIGS. 1 to 7, a control device according to an embodiment of the present invention and a link mechanism including the control device are described hereinafter. As illustrated in FIG. 1, the link mechanism 1 includes a base body 2, a distal end 3, a plurality of joint mechanisms Ji (i=1, 2, ..., N), a plurality of link members Li (i=0, 1, ..., N), an actuator 4 (See FIG. 2), and a control device 30 (See FIG. 6).

The character "i" of the plurality of joint mechanisms Ji represents the order in which the joint mechanisms are counted from 1 in the direction starting from the base body 2 toward the distal end 3. For expressly specifying that the joint mechanism is of the i-th order, the joint mechanism is referred to as "i-th joint mechanism." For example, the joint mechanism of the j-th order is sometimes referred to as "j-th joint mechanism Jj." Moreover, the character "i" of the plurality of link members Li represents the order in which the link members are counted from 0 in the direction starting from the base 2 toward the distal end 3. For expressly specifying that the link member is of the i-th order, the link member is referred to as "i-th link member." For example, the link member of the j-th order is sometimes referred to as "j-th link member Lj."

The base body 2 is fixed to the predetermined position on a floor surface or the like. In addition, the base body 2 may have a motive power unit or the like and be adapted so that the position and posture of the base body 2 can be changed according to the driving force of the motive power unit. The distal end 3 functions as an end effector in the link mechanism 1. The distal end 3 is coupled to the base body 2 by the plurality of link members Li coupled to each other via the plurality of joint mechanisms Ji.

Two link members Li−1 and Li are coupled to each of the plurality of joint mechanisms Ji (i=1, ..., N).

Moreover, each of the plurality of joint mechanisms Ji is adapted to change the relative position and posture of the two link members Li−1 and Li coupled to the joint mechanism Ji.

In this embodiment, all joint mechanisms Ji are configured as rotary joint mechanisms. Therefore, in the subsequent description, the relative position and posture of the two link members Li−1 and Li coupled to the predetermined joint mechanism Ji are sometimes referred to as "joint angle ψ_i. The terms "the joint angle ψ_i changes" in this embodiment corresponds to the terms "the joint mechanism is displaced" in the present invention.

In addition, each of the plurality of joint mechanisms Ji is provided with an angle sensor (not illustrated) which detects the joint angle ψ_i of the joint mechanism Ji concerned (hereinafter, the joint angle ψ_i detected by the angle sensor is referred to as "actual joint angle ψ_act_i").

Although all joint mechanisms Ji are each configured as a rotary joint mechanism in this embodiment, each of the joint mechanisms Ji may be configured as either of a rotary joint mechanism and a linear motion joint mechanism. Moreover, the number of joint mechanisms Ji may be arbitrary.

The actuator 4 is provided in each of the plurality of joint mechanisms Ji and outputs a driving force for displacing each joint mechanism Ji. Moreover, a speed sensor (not illustrated) is provided in each link member Li. This speed sensor recognizes relative speed (hereinafter, referred to as "collision relative speed") ΔV between the link member Li and an external object Obj when the link member Li collides with the external object Obj.

The control device 30 is an electronic circuit unit including a CPU, a memory, and the like which are not illustrated, and the CPU executes a program for controlling the link mechanism 1 stored in the memory.

(1-2. Joint Mechanism)
(1-2-1. Structure of Joint Mechanism)

Subsequently, the details of the plurality of joint mechanisms Ji will be described with reference to FIGS. 2 to 5. In this embodiment, all joint mechanisms Ji are rotary joint mechanisms having the same structure.

Figure 2:
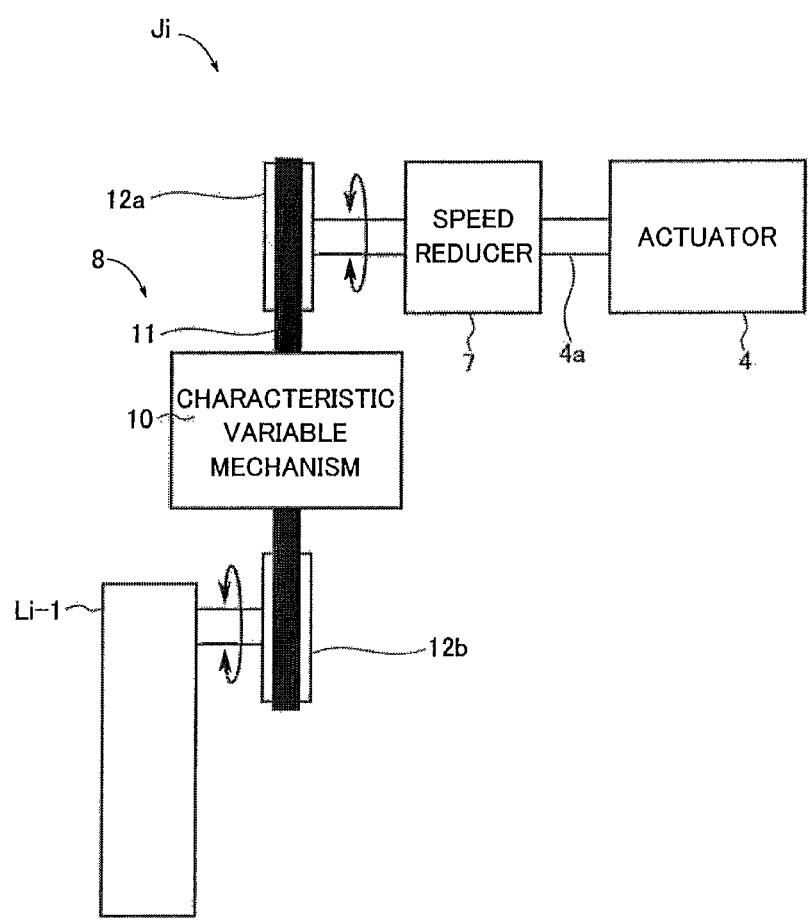
FIG. 2 is a diagram illustrating a joint mechanism of the link mechanism according to the embodiment.

As illustrated in FIG. 2, the joint mechanism Ji includes a wire 11, a drive pulley 12a, a driven pulley 12b, and a transmission mechanism 8, which generates an elastic force and a viscous force between these pulleys 12a and 12b.

Moreover, a speed reducer 7 coupled to an actuator output shaft 4a of the actuator 4 is coupled to the drive pulley 12a. The drive pulley 12a rotates in conjunction with the rotation of the actuator output shaft 4a due to a rotational driving force (torque) imparted by the actuator 4 via the speed reducer 7.

The speed reducer 7 may have an arbitrary structure. For example, it is possible to employ a speed reducer composed of a harmonic drive (registered trademark) or a plurality of gears. Alternatively, the speed reducer 7 may have a mechanism for converting a linear motion to a rotational motion. In that case, as the actuator, for example, a linear motion actuator composed of an electric motor and ball screws, an electric linear motor, or the like may be employed.

Moreover, in the i-th joint mechanism Ji, the i-th link member Li rotationally supports the drive pulley 12a and the driven pulley 12b (not illustrated). In addition, in the i-th joint mechanism Ji, the (i−1)-th link member Li−1 is fixed to the driven pulley 12b.

The driven pulley 12b is laterally disposed in parallel with the drive pulley 12a in such a way that the rotational central axis of the driven pulley 12b is parallel to the rotational central axis of the drive pulley 12a.

The transmission mechanism 8 includes a characteristic variable mechanism 10 for changing the stiffness and viscosity between the pulleys 12a and 12b and a wire 11 suspended between the drive pulley 12a and the driven pulley 12b.

Figure 3:
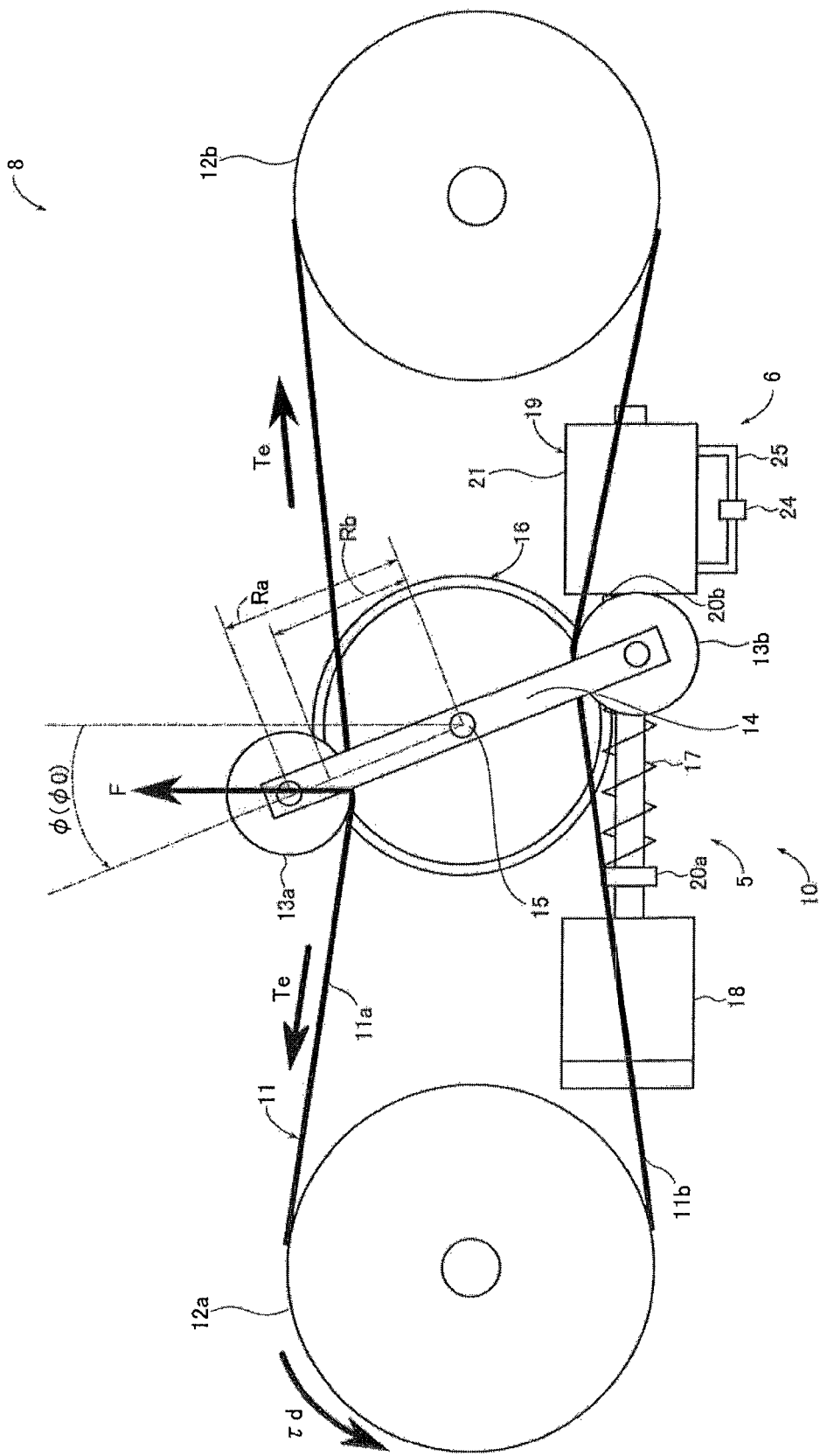
FIG. 3 is a diagram illustrating a transmission mechanism of the joint mechanism in FIG. 2.

As illustrated in FIG. 3, the wire 11 has two-rowed tightly-stretched portions 11a and 11b extending between the pulleys 12a and 12b, and the portions other than the tightly-stretched portions 11a and 11b are wrapped around the part excluding the inner-end side portions (a portion on the outer periphery of the drive pulley 12a which faces the driven pulley 12b and a portion on the outer periphery of the driven pulley 12b which faces the drive pulley 12a) on the pulleys 12a and 12b in such a way as to avoid slipping. The wire 11 has some stretchability.

Figure 4:
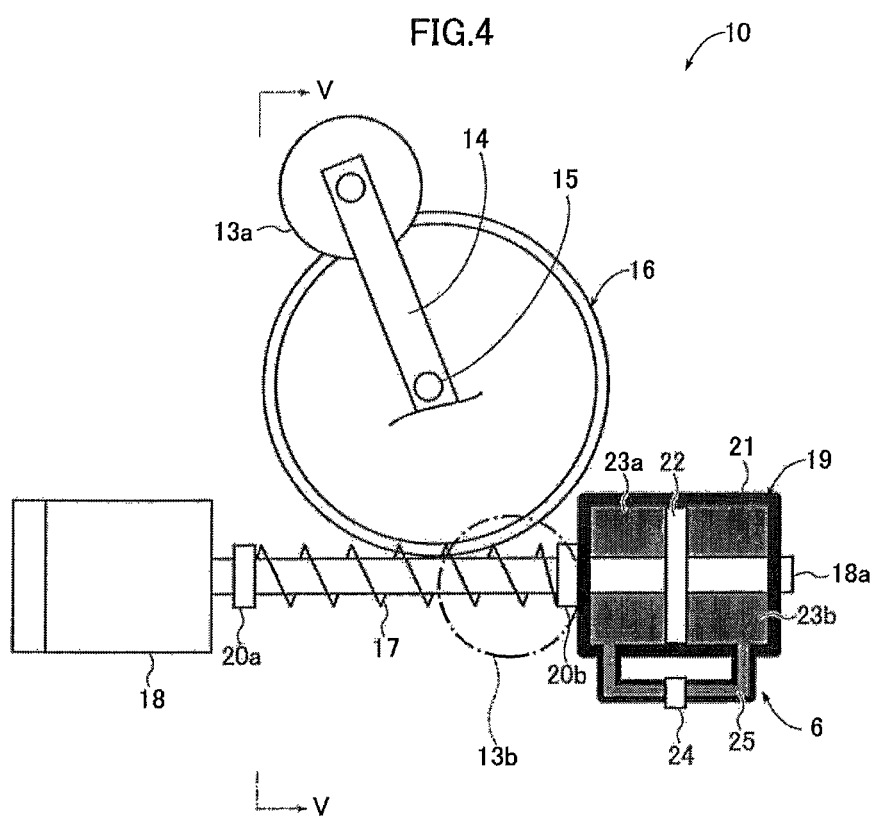
FIG. 4 is a diagram illustrating a characteristic variable mechanism of the transmission mechanism in FIG. 3.
Figure 5:
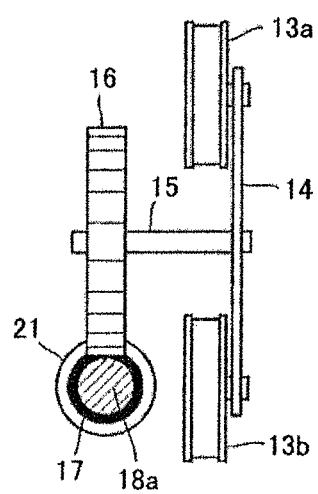
FIG. 5 is a sectional view taken along line V-V of FIG. 4.

The characteristic variable mechanism 10 is configured, for example, as illustrated in FIGS. 3 to 5. Specifically, the characteristic variable mechanism 10 includes a rotating bar 14 at both ends of which rollers 13a and 13b are pivotally mounted so as to be free to rotate. The rotating bar 14 is rotatable integrally with the rotary shaft 15 about the central axis of the rotary shaft 15 fixed to the central part of the rotating bar 14. The rotary shaft 15 is arranged in a posture parallel to the rotational central axes of the pulleys 12a and 12b in the position between the drive pulley 12a and the driven pulley 12b.

The rollers 13a and 13b at both ends of the rotating bar 14 have rotational central axes directed in a direction parallel to the rotational central axis of the drive pulley 12a and to the rotational central axis of the driven pulley 12b.

Furthermore, the outer peripheral portion on the inner-end side (the side facing the other roller 13b) of one roller 13a of the rollers 13a and 13b is pressure-contacted to one tightly-stretched portion 11a of the two-rowed tightly-stretched portions 11a and 11b of the wire 11 and the outer peripheral portion on the inner-end side (the side facing one roller 13b) of the other roller 13b is pressure-contacted to the other tightly-stretched portion 11b of the wire 11. In this case, the tightly-stretched portions 11a and 11b of the wire 11 are curved at pressure-contacted portions of the rollers 13a and 13b, respectively.

The characteristic variable mechanism 10 further includes a gear (spur wheel) 16 coupled to the rotating bar 14 via the rotary shaft 15 and provided so as to be rotatable integrally with the rotating bar 14, a spring worm 17 meshed with the gear 16, an electric motor 18 which rotationally drives the spring worm 17, and a cylinder 19 in which viscous oil is sealed internally.

The spring worm 17 is a spring member which is formed into a coil spring shape so as to be able to function as a worm gear and is externally inserted into a rotary drive shaft 18a of the electric motor 18. Further, one end of the electric motor 18 of the spring worm 17 relatively close to the body is fixed to a spring seat member 20a fixed to the rotary drive shaft 18a. Therefore, the spring worm 17 rotates integrally with the rotary drive shaft 18a of the electric motor 18 and the gear 16 rotates along with the rotation of the spring worm 17.

The cylinder 19 has a tubular portion 21 arranged coaxially with the rotary drive shaft 18a at the other end of the spring worm 17. The rotary drive shaft 18a of the electric motor 18 passes through the inside of the tubular portion 21. Further, the tubular portion 21 is slidable in the central axis direction of the rotary drive shaft 18a along the rotary drive shaft 18a. In addition, the other end of the spring worm 17 is fixed to the spring seat member 20b fixed to the end surface of the tubular portion 21 on the spring worm 17 side. Therefore, with the extension and retraction of the spring worm 17, the tubular portion 21 of the cylinder 19 slides in the central axis direction of the rotary drive shaft 18a of the electric motor 18.

Moreover, a piston 22 fixed to the rotary drive shaft 18a is provided inside the tubular portion 21, and the outer peripheral surface of the piston 22 is slidingly contacted to the inner peripheral surface of the tubular portion 21.

Further, viscous oil is sealed in two oil chambers 23a and 23b defined by the piston 22 inside the tubular portion 21. These oil chambers 23a and 23b are communicated with each other by a communication pipe 25 having an orifice portion 24. In this case, the orifice portion 24 is able to change the opening area by using a valve system or the like not illustrated.

(1-2-2. Operation of Joint Mechanism)

The operation of the joint mechanism Ji having the above structure is described below. The electric motor 18 rotationally drives the spring worm 17, by which the rotating bar 14 rotates via a gear 16 meshed with the spring worm 17. Therefore, the servo control of the electric motor 18 enables the control of a rotation angle (phase angle) of the rotating bar 14. In the following description, the phase angle of the rotating bar 14 is, as illustrated in FIG. 3, defined as a rotation angle $\phi$ of the rotating bar 14 from a state where the extending direction of the rotating bar 14 (the direction of the distance between the rollers 13a and 13b) is orthogonal to the direction of the distance between the drive pulley 12a and the driven pulley 12b.

It is supposed that a motive power transmission (the transmission of a rotational driving force) between the pulleys 12a and 12b is not performed and a phase angle $\phi$ of the rotating bar 14 is controlled to a given angle value (for example, $\phi 0$ in FIG. 3) and, in that state, the rotation of the rotary drive shaft 18a of the electric motor 18 (consequently, the rotation of the spring worm 17) is stopped (hereinafter, this state is referred to as "reference state").

When a rotational driving force (torque) is imparted from the actuator 4 to the drive pulley 12a in the reference state, a tension proportional to the rotational driving force is generated in one of the tightly-stretched portions 11a and 11b of the wire 11 and the rotational driving force is transmitted from the drive pulley 12a to the driven pulley 12b via the tension.

At the same time, a translational force in a direction substantially orthogonal to the direction of the distance between the pulleys 12a and 12b acts on the roller 13a or 13b in contact with the tightly-stretched portion 11a or 11b out of the rollers 13a and 13b due to the above tension generated in one of the tightly-stretched portions 11a and 11b of the wire 11.

For example, when a counterclockwise torque τd is imparted to the drive pulley 12a as illustrated in FIG. 3, a tension Te proportional to the torque τd (=τd/effective rolling radius of the drive pulley 12a) is generated in the tightly-stretched portion 11a of the wire 11 and a translational force F acts on the roller 13a due to the tension Te. The magnitude of the translational force F is substantially proportional to the torque τd. In addition, the tension Te in FIG. 3 represents tension acting on the roller 13a.

Unless the phase angle of the rotating bar 14 in the reference state is zero (for example, the state illustrated in FIG. 3), a rotational driving force (torque) acts on the rotating bar 14 due to the aforementioned translational force (hereinafter, this is denoted by F) acting on the roller 13a or 13b. Thereby, the drive pulley 12a rotates relatively to the driven pulley 12b and the rotating bar 14 rotates. Consequently, the gear 16 meshed with the spring worm 17 rotates integrally with the rotating bar 14.

In this case, the torque acting on the rotating bar 14 due to the aforementioned translational force F acting on the roller 13a or 13b (hereinafter, the torque is denoted by τa) has a relationship represented by the following expression (122-1) relative to the aforementioned translational force F. As illustrated in FIG. 3, φ0 is a value of the phase angle φ of the rotating bar 14 in the reference state and Ra is a rolling radius of the shaft portion of the roller 13a or 13b about the central axis of the rotary shaft 15.

$$\tau a = F^* \sin(\phi 0)^* Ra \quad (122\text{-}1)$$

In the state where the torque τa acts on the rotating bar 14 in this manner, the spring worm 17 does not rotate, and therefore the rotation of the gear 16 extends or retracts a part of the spring worm 17 (more specifically, the part between the meshed portion of the gear 16 and the spring seat member 20a on the electric motor 18 side), by which the spring worm 17 generates an elastic force appropriate to the extension or retraction amount.

In this case, the extension or retraction amount from the reference state of the spring worm 17 and consequently the rotation amount (a change amount in phase angle) from the reference state of the rotating bar 14 are in equilibrium in a state where a torque acting on the gear 16 due to the elastic force (translational force) of the spring worm 17 is balanced with a torque acting on the rotating bar 14 (=a torque acting on the gear 16) due to the aforementioned translational force F acting on the roller 13a or 13b due to the tension of the wire 11. In this equilibrium state, the torque rd imparted to the drive pulley 12a is transmitted to the driven pulley 12b via the transmission mechanism 8.

Assuming that Δφ[rad] is the rotation amount of the rotating bar 14 from the reference state in the above equilibrium state, Rb is the rolling radius of the gear 16, and k_sp_w is the stiffness of the spring worm 17 (a change amount in elastic force generated per unit change amount in the extension or retraction amount of the spring worm 17), the torque acting on the gear 16 due to the elastic force of the spring worm 17 in the above equilibrium state (hereinafter, the torque is denoted by τb) is obtained by the following expression (122-2):

$$\tau b = k\_sp\_w^* \sin(\Delta\phi)^* Rb \approx k\_sp\_w^* \Delta\phi^* Rb \quad (122\text{-}2)$$

From this expression (122-2) and the aforementioned expression (122-1), the relationship between the translational force F in the aforementioned equilibrium state and the rotation amount Δφ from the reference state of the rotating bar 14 is obtained by the following expression (122-3):

$$F = (k\_sp\_w^* Rb/(\sin(\phi 0)^* Ra))^* \Delta\phi \quad (122\text{-}3)$$

Therefore, the translational force F acting on the roller 13a or 13b due to the tension of the wire 11 is proportional to the rotation amount Δφ from the reference state of the rotating bar 14.

The translational force F acting on the roller 13a or 13b due to the tension of the wire 11 is larger as the torque imparted to the drive pulley 12a (and consequently the torque transmitted to the driven pulley 12b) increases. In addition, the relative rotation amount of the drive pulley 12a relative to the driven pulley 12b (the relative rotation amount from the reference state) is larger as the rotation amount of the rotating bar 14 from the reference state in the aforementioned equilibrium state increases.

Therefore, if τsp denotes a torque transmitted from the drive pulley 12a to the driven pulley 12b (a torque imparted to the driven pulley 12b) in the steady state in which the relative rotation amount between the pulleys 12a and 12b is maintained constant and AO denotes the relative rotation amount between the pulleys 12a and 12b, a proportional relation represented by the following expression (122-4) is approximately established between τsp and Δθ:

$$\tau sp = k^* \Delta\theta \quad (122\text{-}4)$$

Accordingly, the transmission mechanism 8 functions as a spring member which transmits motive power between the drive pulley 12a and the driven pulley 12b. In addition, the above torque τsp corresponds to a torque transmitted due to the elastic force (hereinafter, referred to as "elastic force torque") generated between the pulleys 12a and 12b by the transmission mechanism 8. In this case, k in the expression (122-4) is a ratio of a change in the elastic force torque τsp relative to a change in the relative rotation amount Δθ between the pulleys 12a and 12b.

This k indicates the stiffness between the pulleys 12a and 12b. The larger the value of k is, the higher the stiffness between the pulleys 12a and 12b is (a difference in the rotation amount between the pulleys 12a and 12b is more unlikely to occur). The value of the stiffness k of the transmission mechanism 8 is basically appropriate to the phase angle φ0 of the rotating bar 14 in the reference state. The larger the value of φ0 is, the smaller the value of the stiffness k is.

The memory of the control device 30 stores and retains a table in which the phase angle φ0 of the rotating bar 14 in the reference state is associated with the stiffness k. When controlling the value of the stiffness k of the transmission mechanism 8 to be a value of stiffness to be desired (hereinafter, referred to as "desired stiffness") k_cmd, the control device 30 acquires the phase angle φ0 of the rotating bar 14 in the reference state relative to the desired stiffness k_cmd according to the table stored and retained in the memory and controls the electric motor 18 so that the phase angle φ0 of the rotating bar 14 is the phase angle φ0 concerned.

The electric motor 18, the spring worm 17, the gear 16, the rotating bar 14, and the wire 11 will be referred to collectively as "elastic element 5." In addition, the stiffness k between the pulleys 12a and 12b is referred to as the stiffness k of the elastic element 5. Moreover, the relative rotation amount Δθ between the pulleys 12a and 12b is an elastic displacement amount of the elastic element 5 (specifically, corresponds to the elastic deformation amount of the elastic element in the present invention).

Moreover, in the transmission mechanism 8 of this embodiment, the tubular portion 21 of the cylinder 19 slides relatively to the piston 22 along with the extension and retraction of the spring worm 17 when the rotating bar 14 rotates from the reference state.

In this sliding, viscous oil circulates via the communication pipe 25 having the orifice portion 24 between the oil chambers 23a and 23b, thereby generating a viscous force to be a resistance force to the sliding of the tubular portion 21. This generates a viscous force to be a resistance force to the rotation of the rotating bar 14 from the reference state and, consequently, to the relative rotation of the drive pulley 12a relative to the driven pulley 12b, between the pulleys 12a and 12b. This viscous force is changed by changing the opening area of the orifice portion 24.

In this case, the viscous force generated in the cylinder 19 when the opening area of the orifice portion 24 is maintained constant is proportional to the moving speed of the tubular portion 21 relative to the piston 22, and consequently to the extension or retraction speed of the spring worm 17. Furthermore, the extension or retraction speed of the spring worm 17 is substantially proportional to the rotational speed of the rotating bar 14.

The time rate of change of the relative rotation amount between the pulleys 12a and 12b, in other words, the relative rotational speed between the pulleys 12a and 12b (a difference in rotational angular speed between the pulleys 12a and 12b) is appropriate to the rotational speed of the rotating bar 14. Therefore, the higher the rotational speed of the rotating bar 14 is, the higher the relative rotational speed between the pulleys 12a and 12b is.

Accordingly, if $\Delta\omega\_pulley$[rad/s] denotes the relative rotational speed between the pulleys 12a and 12b and $\tau dp$ denotes the torque imparted to the driven pulley 12b due to the viscous force between the pulleys 12a and 12b (hereinafter, referred to as "viscous torque"), the relationship represented by the following expression (122-5) is approximately established between $\Delta\omega\_pulley$ and $\tau dp$:

$$\tau dp = C^* \Delta\omega\_pulley \tag{122-5}$$

Therefore, the transmission mechanism 8 also has a function of generating a viscous force between the drive pulley 12a and the driven pulley 12b. In this case, C in the expression (122-5) is a ratio of a change in the viscous torque $\tau dp$ relative to a change in the relative rotational speed $\Delta\omega\_pulley$ between the pulleys 12a and 12b, and the ratio is hereinafter referred to as "viscosity coefficient C."

The viscosity coefficient C indicates the degree of the viscosity between the pulleys 12a and 12b. The larger the value of C is, the higher the viscosity between the pulleys 12a and 12b is (the viscous force generated between the pulleys 12a and 12b easily increases). In addition, the value of the viscosity coefficient C of the transmission mechanism 8 is basically appropriate to the opening area of the orifice portion 24. Therefore, the larger the opening area is, the value of C decreases.

The memory of the control device 30 stores and retains a table in which the opening area of the orifice portion 24 is associated with the viscosity coefficient C. When controlling the value of the viscosity coefficient C of the transmission mechanism 8 to be a viscosity coefficient to be desired (hereinafter, referred to as "desired viscosity coefficient") C_cmd, the control device 30 acquires the opening area of the orifice portion 24 relative to the desired viscosity coefficient C_cmd according to the table stored and retained in the memory and controls the opening area of the orifice portion 24 to be the acquired opening area.

Hereinafter, the cylinder 19 and the orifice portion 24 will be referred to collectively as "viscous element 6." Moreover, the viscosity coefficient C between the pulleys 12a and 12b is referred to as the viscosity coefficient C of the viscous element 6.

(2. Control Device)

Figure 6:
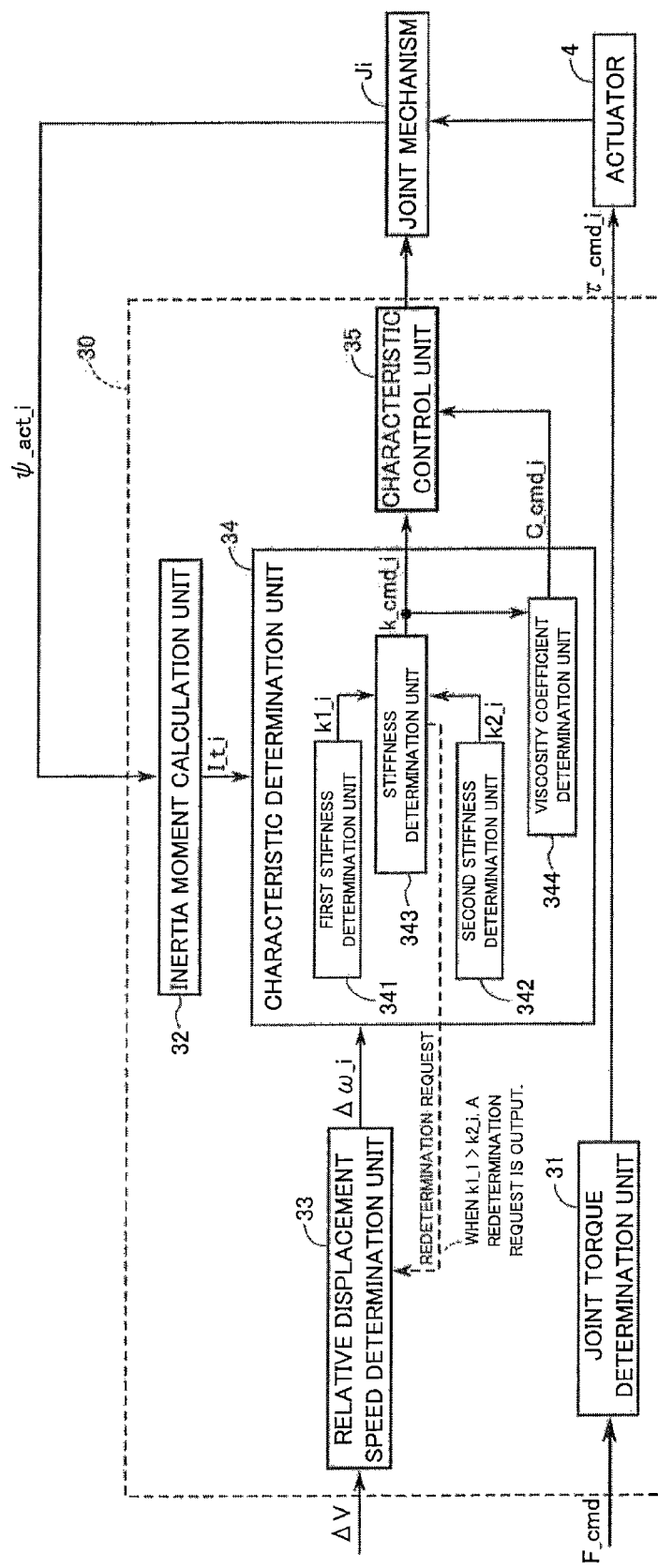
FIG. 6 is a functional block diagram of the control device for the link mechanism according to the embodiment.

Subsequently, the details of the control device 30 will be described with reference to FIG. 6.

In the subsequent description, "_i" is added to the end of a sign if the sign related to the i-th joint mechanism Ji (i indicates the order of the joint mechanisms counted in the direction from the base body 2 toward the distal end 3) is expressly represented.

Moreover, the control device 30 of this embodiment performs a control by using a coordinate system (hereinafter, referred to as "base body coordinate system") fixed to the base body 2 unless otherwise specified. If a value related to the x axis, y axis, or z axis on the base body coordinate system is expressly represented, "_x", "_y", or "_z" is added to the end of a sign.

Moreover, among one or more joint mechanisms Ji between a link member which collides with an object Obj (hereinafter, referred to as "collision link member") Lcoll and base body 2, the joint mechanism Ji closest to the collision link member Lcoll is referred to as "Jcoll." Moreover, when a value related to the collision link member Lcoll is represented, "_coll" is added to the end of a sign in some cases. In this instance, coll is one of 1 to N.

The collision link member Lcoll in this embodiment corresponds to the movable part in the present invention. In addition, every link member Li (i=1, 2, . . . , or N) having one or more joint mechanisms Ji between the link member and the base body 2 might collide with the object Obj. Therefore, every link member Li (i=1, 2, . . . , or N) can be the movable part in the present invention.

The control device 30 includes a joint torque determination unit 31, an inertia moment calculation unit 32, a relative displacement speed determination unit 33, a characteristic determination unit 34, and a characteristic control unit 35. In addition, the characteristic determination unit 34 includes a first stiffness determination unit 341, a second stiffness determination unit 342, a stiffness determination unit 343, and a viscosity coefficient determination unit 344.

The joint torque determination unit 31 determines a desired torque $\tau\_cmd\_i$ of each joint mechanism Ji on the basis of a desired force F_cmd which is a target of a force acting on the distal end 3 (See "2-1. Desired torque"). Further, the joint torque determination unit 31 controls the actuator 4 so that the output torque of the joint mechanism Ji is the desired torque $\tau\_cmd\_i$.

The inertia moment calculation unit 32 calculates an inertia moment I_t_i obtained when the object joint mechanism Ji is displaced on the basis of the joint angle $\psi\_i$ of the object joint mechanism Ji output from an angle sensor provided in the object joint mechanism Ji in each of one or more joint mechanisms existing between the base body 2 and the collision link member Lcoll (hereinafter, the above one or more joint mechanisms are referred to as "object joint mechanisms") Ji (i=1, 2, . . . , coll) (See "2-2. Inertia moment").

The relative displacement speed determination unit 33 determines a relative joint displacement speed $\Delta\omega\_i$ from the collision relative speed $\Delta V$ output from a speed sensor provided in the collision link member Lcoll out of the link members Li (See "2-3. Relative joint displacement speed"). Note that the relative joint displacement speed $\Delta\omega\_i$ represents a change amount in the speed of the joint displacement (hereinafter, referred to as "joint displacement speed") $\omega\_i$ of each object joint mechanism Ji which is caused by a collision of the collision link member Lcoll against the object Obj. In this embodiment, the joint mechanism Ji is a rotary joint mechanism and therefore the joint displacement speed $\omega\_i$ is an angular speed.

Furthermore, the first stiffness determination unit 341 determines the first stiffness k1_i of the elastic element 5 of the object joint mechanism Ji on the basis of the inertia moment I_t_i when the object joint mechanism Ji is displaced and the relative joint displacement speed $\Delta\omega\_i$ of the object joint mechanism Ji in each object joint mechanism Ji (See "2-4-1. First stiffness"). In this case, the first stiffness determination unit 341 determines the first stiffness k1_i of the object joint mechanism Ji so that the joint maximum elastic energy is equal to or more than the joint collision kinetic energy in each object joint mechanism Ji.

The joint maximum elastic energy is "an elastic energy of the elastic element 5 of the object joint mechanism Ji in the case where the elastic displacement amount $\Delta\theta\_i$ of the elastic element 5 of the object joint mechanism Ji is the maximum displacement amount $\Delta\theta\_lim\_i$ of the elastic element 5 of the object joint mechanism Ji." Moreover, the joint collision kinetic energy is "kinetic energy of the i-th object joint mechanism Ji when the i-th object joint mechanism Ji is displaced at the relative joint displacement speed $\Delta\omega\_i$ of the i-th object joint mechanism Ji determined by the relative displacement speed determination unit 33."

Thereby, if the stiffness k_i of the elastic element 5 of the object joint mechanism Ji is equal to or more than the first stiffness k1_i in each object joint mechanism Ji, all of the joint collision kinetic energy is converted to elastic energy accumulated in the elastic element 5 by elastic deformation of the elastic element 5 of the object joint mechanism Ji. This prevents a damage of the object joint mechanism Ji caused by a collision of the collision link member Lcoll against the object Obj.

Moreover, the second stiffness determination unit 342 determines second stiffness k2_i of the elastic element 5 of the object joint mechanism Ji on the basis of the inertia moment I_t_i obtained when the object joint mechanism Ji is displaced and the relative joint displacement speed Δω_i of the object joint mechanism Ji in each object joint mechanism Ji (See "2-4-2. Second stiffness"). In this determination, the second stiffness determination unit 342 determines the second stiffness k2_i of the object joint mechanism Ji so that a first time is equal to or longer than a second time in each object joint mechanism Ji.

In the above, the term "first time" means a time interval from a time point when the displacement of the i-th object joint mechanism Ji is started due to the collision of the collision link member Lcoll against the object Obj to a time point when the displacement of the i-th object joint mechanism Ji is started due to the elastic energy of the elastic element 5 of the i-th object joint mechanism Ji accumulated by the displacement of the i-th object joint mechanism Ji.

Moreover, the term "second time" means the achievable minimum time in the object joint mechanism Ji in the case of changing the joint displacement speed ω_i of the i-th object joint mechanism Ji by a speed obtained by inverting the direction of the relative joint displacement speed Δω_i of the object joint mechanism Ji determined by the relative displacement speed determination unit 33 by displacing the i-th object joint mechanism Ji using the actuator 4.

Thereby, if the stiffness k_i of the elastic element 5 of the object joint mechanism Ji is equal to or less than the second stiffness k2_i in each object joint mechanism Ji, the joint displacement speed ω_i of the object joint mechanism Ji is able to be changed by the speed obtained by inverting the direction of the relative joint displacement speed Δω_i of the object joint mechanism Ji determined by the relative displacement speed determination unit 33 by displacing the object joint mechanism Ji using the actuator 4 within a "required time period."

The aforementioned term "required time period" means a time period from a time point when the displacement of the object joint mechanism Ji is started due to the collision of the collision link member Lcoll against the object Obj to a time point when the displacement of the object joint mechanism Ji is started due to the elastic energy of the elastic element 5 of the object joint mechanism Ji accumulated by the displacement of the object joint mechanism Ji caused by the collision (specifically, a time point when the release of the elastic energy is started) (in other words, a duration in which the joint collision kinetic energy is converted to the elastic energy of the elastic element 5 of the object joint mechanism Ji).

This prevents the object joint mechanism Ji from being forcibly displaced by the elastic energy of the elastic element 5 of the object joint mechanism Ji. Therefore, this prevents the object joint mechanism Ji from being damaged by the collision of the collision link member Lcoll against the object Obj.

In addition, the stiffness determination unit 343 determines the desired stiffness k_cmd_i of each object joint mechanism Ji within a range between the first stiffness k1_i or more and the second stiffness k2_i or less (See "2-4-3. Desired stiffness").

Moreover, the viscosity coefficient determination unit 344 determines the desired viscosity coefficient C_cmd_i of the viscous element 6 of each object joint mechanism Ji appropriate to the determined desired stiffness k_cmd_i so that the behavior characteristic of each object joint mechanism Ji is the characteristic of the critical damping or overdamping (See "2-5. Desired viscosity coefficient").

This prevents the behavior characteristic of each object joint mechanism Ji from being the characteristic of the damped oscillation, prevents the occurrence of the oscillation of the collision link member Lcoll responsive to the damped oscillation of the object joint mechanism Ji, and prevents the occurrence of a collision between the collision link member Lcoll and the object Obj caused by the elasticity of the elastic element 5 of each object joint mechanism Ji. Therefore, it prevents the damage of each object joint mechanism Ji caused by a collision of the collision link member Lcoll against the object Obj.

Additionally, the characteristic control unit 35 controls each object joint mechanism Ji so that the stiffness k_i of the elastic element 5 of each object joint mechanism Ji is the desired stiffness k_cmd_i and controls each object joint mechanism Ji so that the viscosity coefficient C_i of the viscous element 6 of each object joint mechanism Ji is the desired viscosity coefficient C_cmd_i.

The details of the aforementioned control will be described below.

(2-1. Desired Torque)

The joint torque determination unit 31 determines a desired torque τ_cmd (=(τ_cmd_1, τ_cmd_2, ..., τ_cmd_N)) of each joint mechanism Ji on the basis of a desired force F_cmd (=(F_cmd_x, F_cmd_y, F_cmd_z)) according to the following expression (21):

$$\tau\_cmd = J^T * F\_cmd \quad (21)$$

where $J^T$ is a transposed matrix of a Jacobian matrix J. The Jacobian matrix J is a Jacobian matrix which regulates the relationship between the displacement speed of the distal end 3 and the joint displacement speed ω_i of each joint mechanism Ji in the base body coordinate system.

Although a three-element vector representing translational three directions of the x, y, and z axes as a desired force F_cmd here, a six-element vector may be used by adding three elements representing the rotational components (roll, pitch, and yaw) about three axes, x, y, and z axes. In this instance, the Jacobian matrix J and the like are arbitrarily set in accordance with the elements of the desired force F_cmd.

(2-2. Inertia Moment)

The inertia moment calculation unit 32 calculates the position and posture of each link member Li according to the actual joint angle ψ_act_i of each joint mechanism Ji. Then, the inertia moment calculation unit 32 calculates an inertia moment I_t_i for displacing the object joint mechanism Ji in each object joint mechanism from the position and posture of each link member Li according to the following expression (22):

[MATH. 5]

$$I\_t\_i = I\_A + I\_B,\quad(22)$$

$$I\_A = \sum_{k=i}^{N} \|(I\_k \cdot a\_i)\|,$$

$$I\_B = \sum_{k=i}^{N} \{\|a\_i \times (rgc\_k - r\_i)\|^2 \cdot m\_k\}$$

In the above, the symbol "×" represents an outer product. Additionally, $I\_k$ is an inertia tensor in rotating the k-th joint mechanism Jk when focusing attention only on the k-th joint mechanism Jk in the base body coordinate system. Moreover, $rgc\_k$ ($=(rgc\_k\_x, rgc\_k\_y, rgc\_k\_z)$) is a position vector representing the center-of-gravity location of the k-th link member Lk. A symbol $r\_i$ ($=(r\_i\_x, r\_i\_y, r\_i\_z)$) is a position vector representing the position of the center of rotation of the i-th object joint mechanism Ji. A symbol $m\_k$ is a mass of the k-th link member Lk. Moreover, $a\_i$ ($=(a\_i\_x, a\_i\_y, a\_i\_z)$) is a rotation axis vector representing the rotation direction of the i-th object joint mechanism Ji. A symbol $a\_i$ is arbitrarily set so as to represent the rotation axis of the i-th object joint mechanism Ji.

Further, "$\|I\_k*a\_i\|$" in the expression (22) is an inertia moment (hereinafter, referred to as "first inertia moment") obtained when the link member Lk is parallel to the rotation center axial line of the i-th object joint mechanism Ji and rotates about the axis passing through the center-of-gravity of the link member Lk in each of the link members Lk (k=i, i+1, ..., N−1, N) between the i-th object joint mechanism Ji and the distal end 3. Therefore, the $I\_A$ in the expression (22) is a total sum of the first inertia moments in the respective link members Lk (k=i, i+1, ..., N−1, N) between the i-th object joint mechanism Ji and the distal end 3.

Moreover, "$\|a\_i \times (rgc\_k - r\_i)\|^2 * m\_k$" in the expression (22) is an inertia moment (hereinafter, referred to as "second inertia moment") obtained when the link member Li is rotated about the rotation axis of the i-th object joint mechanism Ji in each of the link members Lk (k=i, i+1, ..., N−1, N) between the i-th object joint mechanism Ji and the distal end 3. Therefore, the $I\_B$ in the expression (22) is a total sum of the second inertia moments in the respective link members Lk (k=i, i+1, ..., N−1, N) between the i-th object joint mechanism Ji and the distal end 3.

In addition, in each object joint mechanism Ji, the inertia moment $I\_t\_i$ for displacing the object joint mechanism Ji is not limited to the inertia moment calculated according to the expression (22), but may be calculated according to any other arithmetic expression or the like.

(2-3. Relative Joint Displacement Speed)

The relative displacement speed determination unit 33 determines the relative joint displacement speed $\Delta\omega\_i$ of each object joint mechanism Ji corresponding to the collision relative speed $\Delta V$ output from the speed sensor provided in the collision link member Lcoll. In addition, the relative displacement speed determination unit 33 determines the relative joint displacement speed $\Delta\omega\_i$ of each object joint mechanism Ji on the basis of a relative joint limit speed $\Delta\omega\_lim\_i$ described later in addition to the collision relative speed $\Delta V$ in the case where a redetermination request is output from the stiffness determination unit 343 (See the dashed arrow from the stiffness determination unit 343 to the relative displacement speed determination unit 33 in FIG. 6) as described later (See "2-4-4. For the case of first stiffness>second stiffness").

The relative displacement speed determination unit 33 determines the relative joint displacement speed $\Delta\omega\_i$ of each object joint mechanism Ji depending on the collision relative speed $\Delta V$ ($=(\Delta V\_x, \Delta V\_y, \Delta V\_z)$) according to the following expression (23):

$$\Delta\omega = Jcoll^+ * \Delta V \quad(23)$$

In the above, $Jcoll^+$ is a pseudo inverse matrix of the Jacobian matrix Jcoll described below. The Jacobian matrix Jcoll is a Jacobian matrix which regulates the relationship between the displacement speed of the collision link member Lcoll and the joint displacement speed $\omega\_i$ of the object joint mechanism Ji in the base body coordinate system. Additionally, $\Delta\omega$ is represented by ($\Delta\omega\_1, \Delta\omega\_2, \ldots, \Delta\omega\_coll$). Specifically, $\Delta\omega$ is a vector having all of the relative joint displacement speeds $\Delta\omega\_i$ of the respective object joint mechanisms Ji as elements.

It is to be noted that $\Delta\omega$ for the same $\Delta V$ is not necessarily determined as one value. For example, if the link mechanism 1 has redundancy, there is a plurality of $\Delta\omega$ values for the same $\Delta V$. If the link mechanism 1 has redundancy, the pseudo inverse matrix $Jcoll^+$ of the Jacobian matrix Jcoll is set in such a way that the relative joint displacement speed $\Delta\omega\_i$ is larger as the object joint mechanism Ji is closer to the collision link member Lcoll.

Thereby, the object joint mechanism Ji close to the collision link member Lcoll moves more largely, which enables a reduction in the motion of an object joint mechanism Ji closer to the base body 2. Therefore, it is possible to reduce the influence exercised on the base body 2 when the collision link member Lcoll collides with the object Obj.

In this specification, the term, "the object joint mechanism Ji close to the collision link member Lcoll" means an object joint mechanism Ji close to the collision link member Lcoll on a path in which the object joint mechanism Ji and the link member Li are coupled to each other.

(2-4. Determination of Desired Stiffness)

(2-4-1. First Stiffness)

The first stiffness determination unit 341 determines the first stiffness $k1\_i$ so as to be a value equal to or more than the stiffness obtained according to the following expression (241) on the basis of the inertia moment $I\_t\_i$ calculated by the inertia moment calculation unit 32 and the relative joint displacement speed $\Delta\omega\_i$ determined by the relative displacement speed determination unit 33 in each object joint mechanism Ji:

[MATH. 6]

$$I\_t\_i \cdot \left(\frac{\Delta\omega\_i}{\Delta\theta\_lim\_i}\right)^2 \quad(241)$$

In the above, the maximum displacement amount $\Delta\theta\_lim\_i$ of the elastic element 5 of the i-th object joint mechanism Ji is $\Delta\theta\_lim\_i$ satisfying "$\tau\_lim\_i = k\_i * \Delta\theta\_lim\_i$" if $\tau\_lim\_i$ is the load torque limit of the i-th object joint mechanism Ji (the maximum torque able to be transmitted by the i-th object joint mechanism Ji) and $k\_i$ is the stiffness of the elastic element 5. The maximum displacement amount $\Delta\theta\_lim\_i$ of the elastic element 5 of the i-th object joint mechanism Ji may be an elastically deformable displacement limit of the elastic element 5 of the i-th object joint mechanism Ji. In this instance, for example, the value is determined according to the elastically deformable displacement limit of the spring worm 17.

The expression (241) is the stiffness k_i of the elastic element 5 of the i-th object joint mechanism Ji satisfying the following expression (241-1):

[MATH. 7]

$$\frac{1}{2} I\_t\_i \cdot \Delta\omega\_i^2 = \frac{1}{2} k\_i \cdot \Delta\theta\_{lim}\_i^2 \quad (241\text{-}1)$$

In the expression (241-1), the left-hand side is the aforementioned joint collision kinetic energy (See "2. Control device"). Moreover, the right-hand side is the aforementioned joint maximum elastic energy (See "2. Control device").

Setting the first stiffness k1_i of the i-th object joint mechanism Ji to a value equal to or more than the stiffness obtained according to the expression (241) means that the joint maximum elastic energy in the right-hand side is equal to or more than the joint collision kinetic energy in the left-hand side in the expression (241-1), in other words, all of the joint collision kinetic energy is converted to elastic energy of the elastic element 5 of the i-th object joint mechanism Ji. Therefore, the setting of the first stiffness k1_i to a value equal to or more than the stiffness obtained according to the expression (241) prevents each object joint mechanism Ji from being damaged by a collision of the collision link member Lcoll against the object Obj.

(2-4-2. Second Stiffness)

The second stiffness determination unit 342 determines the second stiffness k2_i so as to be a value equal to or less than the stiffness obtained according to the following expression (242) on the basis of the inertia moment I_t_i calculated by the inertia moment calculation unit 32 and the relative joint displacement speed Δω_i determined by the relative displacement speed determination unit 33 in each object joint mechanism Ji.

[MATH. 8]

$$I\_t\_i \cdot \left( \frac{\pi \cdot A\_{max}\_i}{2 \cdot \Delta\omega\_i} \right)^2 \quad (242)$$

In the above, in the expression (242), A_max_i indicates the maximum acceleration achievable in the i-th object joint mechanism Ji when the i-th object joint mechanism Ji is displaced by the actuator 4.

The expression (242) represents the stiffness k_i of the elastic element 5 of the i-th object joint mechanism Ji satisfying the following expression (242-1):

[MATH. 9]

$$\frac{\pi}{2} \sqrt{\frac{I\_t\_i}{k\_i}} = \frac{\Delta\omega\_i}{A\_{max}\_i} \quad (242\text{-}1)$$

In the expression (242-1), the left-hand side represents a quarter of the period represented by an inverse of the natural frequency of the elastic element 5 of the i-th object joint mechanism Ji when k_i is the stiffness of the elastic element 5 of the i-th object joint mechanism Ji. Specifically, the left-hand side is the aforementioned first time (See "2. Control device").

Moreover, the right-hand side represents a time interval (the minimum time achievable in the i-th object joint mechanism Ji) required in the case of changing the displacement speed ω_i of the i-th object joint mechanism Ji by a speed obtained by inverting the direction of the relative joint displacement speed Δω_i of the i-th object joint mechanism Ji determined by the relative displacement speed determination unit 33 when displacing the i-th object joint mechanism Ji by using the actuator 4 at the maximum acceleration A_max_i achievable in the i-th object joint mechanism Ji. Specifically, the right-hand side is the aforementioned second time (See "2. Control device").

Setting the second stiffness k2_i of the i-th object joint mechanism Ji to a value equal to or less than the stiffness obtained according to the expression (242) means that it is possible to place the i-th object joint mechanism Ji in a state where the i-th object joint mechanism Ji is prevented from being forcibly displaced by the elastic energy of the elastic element 5 of the i-th object joint mechanism Ji by displacing the i-th object joint mechanism Ji by using the actuator 4 during a time period in which the second time in the right-hand side is equal to or less than the first time in the left-hand side in the expression (242-1), in other words, the kinetic energy of the i-th object joint mechanism Ji generated by the collision of the collision link member Lcoll against the object Obj is converted to the elastic energy of the elastic element 5 of the i-th object joint mechanism Ji. This prevents the damage of the i-th object joint mechanism Ji caused by the collision of the collision link member Lcoll against the object Obj.

(2-4-3. Desired Stiffness)

The stiffness determination unit 343 determines the desired stiffness k_cmd_i of the elastic element 5 of the object joint mechanism Ji so as to be a value equal to or more than the first stiffness k1_i and equal to or less than the second stiffness k2_i determined as described above in each object joint mechanism Ji. In each object joint mechanism Ji, the desired stiffness k_cmd_i of the elastic element 5 of the object joint mechanism Ji may be any value as long as the value is within a range between the first stiffness k1_i or more and the second stiffness k2_i or less.

In this embodiment, the stiffness determination unit 343 determines the desired stiffness k_cmd_i of the elastic element 5 so as to be smaller as the object joint mechanism Ji is closer to the collision link member Lcoll.

Thereby, the object joint mechanism Ji closer to the collision link member Lcoll is able to move more easily. The object joint mechanism Ji closer to the collision link member Lcoll is able to move more easily when each object joint mechanism Ji is displaced in response to the displacement of the collision link member Lcoll caused by the collision of the collision link member Lcoll against the object Obj, thereby enabling a reduction in the displacement of the object joint mechanism Ji closer to the base body 2. Therefore, this enables a decrease in the influence on the base body 2 exercised when the collision link member Lcoll collides with the object Obj.

(2-4-4. For the Case of First Stiffness>Second Stiffness)

For example, in the case where the collision relative speed ΔV is large or the like, the relative joint displacement speed Δω_i is large, and consequently, the first stiffness k1_i determined by the first stiffness determination unit 341 may be larger than the second stiffness k2_i determined by the second stiffness determination unit 342 in some cases (hereinafter, this object joint mechanism Ji is referred to as "marginal joint mechanism Jlim_i").

In this case, if the stiffness k_i of the elastic element 5 of the marginal joint mechanism Jlim_i is the first stiffness k1_i, it is impossible to place the i-th object joint mechanism Ji in a state where the i-th object joint mechanism Ji is prevented from being forcibly displaced by the elastic energy of the elastic element 5 of the i-th object joint mechanism Ji by displacing the i-th object joint mechanism Ji by using the actuator 4 during a time period in which the joint collision kinetic energy is converted to the elastic energy of the elastic element 5 of the i-th object joint mechanism Ji.

Accordingly, the control device 30 needs to redetermine the first stiffness k1_i and the second stiffness k2_i so that the first stiffness k1_i is equal to or less than the second stiffness k2_i in the marginal joint mechanism Jlim_i. Therefore, if there is an object joint mechanism Ji (specifically, the marginal joint mechanism Jlim_i) in which the first stiffness k1_i is larger than the second stiffness k2_i, the stiffness determination unit 343 outputs a request for redetermining (hereinafter, referred to as "redetermination request") the relative joint displacement speed $\Delta\omega\_i$ to the relative displacement speed determination unit 33 (See a dashed arrow from the stiffness determination unit 343 to the relative displacement speed determination unit 33 in FIG. 6).

Thereby, the relative displacement speed determination unit 33 redetermines the relative joint displacement speed $\Delta\omega\_i$ as described below.

From the expressions (241-1) and (242-1), it is understood that the joint collision kinetic energy (the left-hand side of the expression (241-1)) decreases and further the first time (the right-hand side of the expression (242-1)) decreases as the relative joint displacement speed $\Delta\omega\_i$ decreases. Moreover, from the expressions (241-1) and (242-1), the joint maximum elastic energy (the right-hand side of the expression (241-1)) decreases and the second time (the left-hand side of the expression (242-1) increases as the stiffness k_i decreases.

In order to decrease the first stiffness k1_i up to the second stiffness k2_i so as to achieve "the joint collision kinetic energy the joint maximum elastic energy" and "the first time the second time" in the marginal joint mechanism Jlim_i, the relative joint displacement speed $\Delta\omega\_i$ of the marginal joint mechanism Jlim_i needs to be decreased up to the relative joint limit speed $\Delta\omega\_lim\_i$ described below. This enables the first time to be decreased. Moreover, the second time can be increased by decreasing the first stiffness k1_i of the marginal joint mechanism Jlim_i.

Accordingly, in this embodiment, the relative displacement speed determination unit 33 determines the relative joint displacement speed $\Delta\omega\_i$ of the marginal joint mechanism Jlim_i in the case of assuming that the stiffness k_i of the elastic element 5 of the marginal joint mechanism Jlim_i is equal to the currently-determined second stiffness k2_i, as a relative joint limit speed $\Delta\omega\_lim\_i$. The relative joint limit speed $\Delta\omega\_lim\_i$ is determined by calculating the relative joint displacement speed $\Delta\omega\_i$ satisfying the expression (241-1) when the stiffness k_i is the second stiffness k2_i.

Thereby, even in the case where the desired stiffness k_cmd_i of the elastic element 5 of the marginal joint mechanism Jlim_i is set to the first stiffness k1_i (in this case, first stiffness k1_i is equal to the second stiffness k2_i), the relative joint displacement speed $\Delta\omega\_i$ decreases. Accordingly, the conditions, "joint collision kinetic energy joint maximum elastic energy" and "first time≤second time" can be satisfied in the marginal joint mechanism Jlim_i.

Furthermore, the relative displacement speed determination unit 33 redetermines the relative joint displacement speed $\Delta\omega\_i$ of the normal joint mechanism Ji so as to be larger than the relative joint displacement speed $\Delta\omega\_i$ of the currently-determined normal joint mechanism Ji in each of the object joint mechanisms (hereinafter, also referred to as "normal joint mechanism") Ji other than the marginal joint mechanism Jlim_i among the respective object joint mechanisms Ji in order to prevent a change in the collision relative speed $\Delta V$ of the collision link member Lcoll in the case where the collision link member Lcoll collides with the object Obj.

The following describes a specific example of the processing of redetermining the relative joint displacement speed $\Delta\omega\_i$ performed by the relative displacement speed determination unit 33. The relative displacement speed determination unit 33 calculates $\Delta\omega\_diff\_i$ according to the following expression (244-1) in each normal joint mechanism Ji:

$$\Delta\omega\_diff\_i = \Delta\omega\_now\_i - \Delta\omega\_lim\_i \qquad (244\text{-}1)$$

In the above, $\Delta\omega\_now\_i$ indicates the relative joint displacement speed $\Delta\omega\_i$ of the currently-determined i-th object joint mechanism Ji.

Then, the relative displacement speed determination unit 33 calculates $\Delta V\_diff$ according to the following expression (244-2):

$$\Delta V\_diff = \Delta V - Jcoll * \Delta\omega\_diff \qquad (244\text{-}2)$$

In the above, $\Delta\omega\_diff$ is a vector having all of "the relative joint displacement speeds $\Delta\omega\_now\_i$ of the normal joint mechanisms Ji among the currently-determined relative joint displacement speeds $\Delta\omega\_now\_i$" and "the relative joint limit speeds $\Delta\omega\_lim\_i$ of the marginal joint mechanisms Jlim_i changed to the relative joint displacement speeds $\Delta\omega\_now\_i$" as elements in each object joint mechanism Ji. For example, if the j-th object joint mechanism Jj and the k-th object joint mechanism Jk are marginal joint mechanisms Jlim_j and Jlim_k, respectively, $\Delta\omega\_diff$ is represented by "($\Delta\omega\_now\_1$, $\Delta\omega\_now\_2$, ..., $\Delta\omega\_lim\_j$, ..., $\Delta\omega\_lim\_k$, ..., $\Delta\omega\_now\_N$)."

Specifically, the second term in the right-hand side of the expression (244-2) represents the displacement speed of the collision link member Lcoll when the relative joint displacement speed $\Delta\omega\_i$ of the marginal joint mechanism Jlim_i is limited to the relative joint limit speed $\Delta\omega\_lim\_i$. Therefore, $\Delta V\_diff$ (=($\Delta V\_diff\_x$, $\Delta V\_diff\_y$, $\Delta V\_diff\_z$)) represents a difference from the collision relative speed $\Delta V$ of the relative displacement speed between the displacement speed of the collision link member Lcoll and the displacement speed of the object Obj, which changes by limiting the relative joint displacement speed $\Delta\omega\_i$ of the marginal joint mechanism Jlim_i to the relative joint limit speed $\Delta\omega\_lim\_i$.

Then, the relative displacement speed determination unit 33 calculates the value of $\Delta\omega\_diff$ according to the following expression (244-3):

$$\Delta\omega\_diff = Jcoll\_norm^{+} * \Delta V\_diff \qquad (244\text{-}3)$$

In the above, $Jcoll\_norm^{+}$ is a pseudo inverse matrix of a Jacobian matrix Jcoll_norm described below. The Jacobian matrix Jcoll_norm is a Jacobian matrix which regulates the relationship between the displacement speed of the collision link member Lcoll and each joint displacement speed $\omega\_i$ of the normal joint mechanisms Ji among the object joint mechanisms Ji (i=1, 2, ..., coll).

Moreover, $\Delta\omega\_diff$ is a vector having all of the relative joint displacement speeds $\Delta\omega\_i$ of the normal joint mechanisms Ji among the object joint mechanisms Ji (i=1, 2, ..., coll) as elements. For example, if the k-th object joint mechanism Jk is a marginal joint mechanism Jlim_k, $\Delta\omega\_diff$ is represented by ($\Delta\omega\_diff\_1$, $\Delta\omega\_diff\_2$, ..., $\Delta\omega\_diff\_k-1$, $\Delta\omega\_diff\_k+1$, ..., $\Delta\omega\_diff\_coll$).

Accordingly, when compensating the change in the displacement speed of the collision link member Lcoll caused by limiting the relative joint displacement speed $\Delta\omega\_i$ of the marginal joint mechanism Jlim_i to the relative joint limit speed $\Delta\omega\_lim\_i$ by the normal joint mechanism Ji, $\Delta\omega\_diff\_i$ represents the extent to which the normal joint mechanism Ji needs to further increase the relative joint displacement speed relative to the currently-determined relative joint displacement speed $\Delta\omega\_now\_i$.

Further, the relative displacement speed determination unit 33 redetermines a new relative joint displacement speed $\Delta\omega\_i$ according to the following expression (244-4) if the object joint mechanism Ji is the normal joint mechanism Ji in each object joint mechanism Ji and redetermines a new relative joint displacement speed $\Delta\omega\_i$ according to the following expression (244-5) if the object joint mechanism Ji is a marginal joint mechanism Jlim_i:

$$\Delta\omega\_i = \Delta\omega\_now\_i + \Delta\omega\_diff\_i \quad (244\text{-}4)$$

$$\Delta\omega\_i = \Delta\omega\_lim\_i \quad (244\text{-}5)$$

Thereafter, the characteristic determination unit 34 redetermines the first stiffness k1_i and the second stiffness k2_i on the basis of the relative joint displacement speed $\Delta\omega\_i$ redetermined as described above by the relative displacement speed determination unit 33 in each object joint mechanism Ji.

According to the above, the decrease in the relative joint displacement speed $\Delta\omega\_i$ of the marginal joint mechanism Jlim_i is compensated by the increase in the relative joint displacement speed $\Delta\omega\_i$ of the normal joint mechanism Ji. This prevents the marginal joint mechanism Jlim_i from being displaced by a joint displacement speed $\omega\_i$ impermissible for the marginal joint mechanism Jlim_i, by which the marginal joint mechanism Jlim_i can be prevented from being damaged.

(2-5. Desired Viscosity Coefficient)

The viscosity coefficient determination unit 344 determines the desired viscosity coefficient C_cmd_i according to the following expression (25) on the basis of the desired stiffness k_cmd_i determined by the stiffness determination unit 343:

[MATH. 10]

$$C\_i = 2 \cdot \zeta \cdot \sqrt{I\_t\_i \cdot k\_cmd\_i} \quad (25)$$

In the above, in the expression (25), $\zeta$ indicates a damping ratio. The damping ratio $\zeta$ is set so that the behavior characteristic of the object joint mechanism Ji is the characteristic of critical damping or overdamping (specifically, $\zeta$ is set to 1 or greater).

(2-6. Flowchart)

An example of the procedure for the above control processing performed by the control device 30 will be described with reference to the flowchart of FIG. 7. The control processing program illustrated in this flowchart is called for every predetermined time period (for example, 10 [msec]) and executed.

The control device 30 determines whether a link member Li to collide with the object Obj exists in the first step ST1, first. The control device 30 estimates that one of the link members Li is likely to collide with the object Obj on the basis of the information from, for example, an external sensor (a camera or the like) which is not illustrated. Further, if the likelihood is equal to or more than a certain level in one of the link members Li, the control device 30 estimates that the link member Li having the likelihood equal to or more than a certain level is a link member Li which is likely to collide with the object Obj.

If there is no link member Li estimated to be likely to collide with the object Obj in each link member Li in step ST1, the control device 30 determines that no link member Li to collide with the object Obj exists and terminates the processing of this flowchart. Moreover, if there is a link member Li estimated to be likely to collide with the object Obj in one of the link members Li in step ST1, the control device 30 determines that a link member Li to collide with the object Obj exists and proceeds to step ST2.

The control device 30 calculates an inertia moment I_t_i in each object joint mechanism Ji when the collision link member Lcoll collides with the object Obj in step ST2 (this calculation corresponds to the processing of the inertia moment calculation unit 32). After the end of the processing of step ST2, the control device 30 proceeds to step ST3 to determine the relative joint displacement speed $\Delta\omega\_i$ corresponding to the collision relative speed $\Delta V$ (this determination corresponds to the processing of the relative displacement speed determination unit 33). After the end of the processing of step ST3, the control device 30 proceeds to step ST4 to determine the first stiffness k1_i and the second stiffness k2_i (this determination corresponds to the processing of the first stiffness determination unit 341 and the second stiffness determination unit 342).

After the end of the processing of step ST4, the control device 30 proceeds to step ST5 to determine whether the first stiffness k1_i is equal to or less than the second stiffness k2_i. If determining that the first stiffness k1_i is more than the second stiffness k2_i in step ST5, the control device 30 proceeds to step ST6. The control device 30 redetermines the relative joint displacement speed $\Delta\omega\_i$ of each object joint mechanism Ji as described above in step ST6, and then returns to step ST4 (this processing corresponds to the processing of the relative displacement speed determination unit 33 described in "2-4-4. For the case of first stiffness>second stiffness").

The control device 30 proceeds to step ST7 if determining that the first stiffness k1_i is equal to or less than the second stiffness k2_i in step ST5. The control device 30 determines the desired stiffness k_cmd_i of each object joint mechanism Ji in step ST7 (this processing corresponds to the processing of the stiffness determination unit 343). After the end of the processing in step ST7, the control device 30 proceeds to step ST8 to determine the desired viscosity coefficient C_cmd_i appropriate to the desired stiffness k_cmd_i of each object joint mechanism Ji (this processing corresponds to the processing of the viscosity coefficient determination unit 344).

After the end of the processing of step ST8, the control device 30 proceeds to step ST9 to control the stiffness k_i and the viscosity coefficient C_i of each object joint mechanism Ji so as to be desired stiffness k_cmd_i and a desired viscosity coefficient C_cmd_i, respectively (this processing corresponds to the processing of the characteristic control unit 35). After the end of the processing of step ST9, the control device 30 terminates the processing of this flowchart.

(3. Variation)

Although the first stiffness determination unit 341 determines the first stiffness k1_i so as to be a value equal to or more than the stiffness obtained according to the aforementioned expression (241) in this embodiment, the first stiffness k1_i may be calculated according to any other arithmetic expression or the like.

Moreover, although the second stiffness determination unit 342 determines the second stiffness k2_i so as to be a value equal to or less than the stiffness obtained according to the aforementioned expression (242) in this embodiment, the second stiffness k2_i may be calculated according to any other arithmetic expression or the like.

Moreover, although the stiffness determination unit 343 determines the desired stiffness k_cmd_i of the elastic element 5 of the object joint mechanism Ji so as to be smaller as the object joint mechanism Ji is closer to the collision link member Lcoll in this embodiment, any value may be determined as the desired stiffness k_cmd_i as long as the value is within a range between the first stiffness k1_i or more and the second stiffness k2_i or less.

Furthermore, although the relative joint displacement speed Δω_i is redetermined according to the aforementioned expressions (244-1) to (244-5) when the first stiffness k1_i becomes greater than the second stiffness k2_i in this embodiment, the relative joint displacement speed Δω_i may be redetermined so that the first stiffness k1_i is equal to or less than the second stiffness k2_i according to another embodiment.

Moreover, the joint mechanism Ji may have an aspect of not including the viscous element 6 as long as the joint mechanism Ji includes at least the elastic element 5.

Moreover, the joint mechanism Ji may have an aspect other than the aspects of this embodiment as long as the motive power is converted to an elastic force and a viscous force before transmission when the motive power is transmitted between the drive-side link and the driven-side link. For example, a conducting polymer actuator with variable stiffness and viscosity coefficients may be used on the motive power transmission path between the drive-side link and the driven-side link.

DESCRIPTION OF REFERENCE NUMBERS

1 Link mechanism
30 Control device
Obj Object
2 Base body
3 Distal end
Ji Joint mechanism
4 Actuator
5 Elastic element
6 Viscous element
11 Wire (elastic element)
14 Rotating bar (elastic element)
16 Gear (elastic element)
17 Spring worm (elastic element)
18 Electric motor (elastic element)
19 Cylinder (viscous element)
24 Orifice portion (viscous element)
Δθ Elastic displacement amount (elastic deformation amount)
Δθ_i Elastic displacement amount (elastic deformation amount)
Δθ_lim_i Maximum displacement amount (maximum deformation amount)
k_i Stiffness
C_i Viscosity coefficient
k1_i First stiffness
k2_i Second stiffness
ΔV Collision relative speed (relative speed)
ω_i Joint displacement speed (displacement speed)
Δω_i Relative joint displacement speed (relative displacement speed)
I_t_i Inertia moment
Lcoll Collision link member (movable part)
33 Relative displacement speed determination unit
34 Characteristic determination unit
35 Characteristic control unit

What is claimed is:

1. A control device for a link mechanism having one or more joint mechanisms provided between a base body and a movable part which is movable relative to the base body and an actuator outputting a driving force for displacing the one or more joint mechanisms, in which each of the one or more joint mechanisms is configured to transmit motive power via an elastically deformable elastic element adapted to have variably controllable stiffness, the control device comprising:
a relative displacement speed determination unit configured to determine a relative displacement speed of each of the one or more joint mechanisms corresponding to a relative speed between the movable part and an external object in a case where the movable part collides with the object;
a characteristic determination unit configured to determine a stiffness of the elastic element of each of the one or more joint mechanisms in the case where the movable part collides with the object so that the stiffness is within a range between first stiffness or more and second stiffness or less determined for each of the one or more joint mechanisms; and
a characteristic control unit configured to control the stiffness of the elastic element of each of the one or more joint mechanisms in the case where the movable part collides with the object so as to be the stiffness determined by the characteristic determination unit;
wherein:
the characteristic determination unit determines the first stiffness so that elastic energy of the elastic element of the joint mechanism concerned in a case where an elastic deformation amount of the elastic element of the joint mechanism is a maximum deformation amount of the elastic element of the joint mechanism is equal to or more than kinetic energy of the joint mechanism which is obtained when the joint mechanism is displaced at a displacement speed of the joint mechanism determined by the relative displacement speed determination unit in each of the one or more joint mechanisms; and
the characteristic determination unit determines the second stiffness so that a time interval from a time point of starting the displacement of the joint mechanism caused by the collision of the movable part against the object to a time point of starting the displacement of the joint mechanism caused by the elastic energy of the elastic element of the joint mechanism accumulated by the displacement of the joint mechanism caused by the collision is equal to or longer than a minimum time achievable in the joint mechanism in a case of changing the displacement speed of the joint mechanism by a speed obtained by inverting a direction of the relative displacement speed of the joint mechanism determined by the relative displacement speed determination unit by displacing the joint mechanism by using the actuator in each of the one or more joint mechanisms.

2. The control device for the link mechanism according to claim 1, wherein, with an arbitrary joint mechanism among the one or more joint mechanisms defined as an i-th joint mechanism, the characteristic determination unit determines the first stiffness of the elastic element of the i-th joint mechanism so as to be equal to or more than stiffness obtained according to the following expression (1):

[MATH. 1]

$$I\_t\_i \cdot \left(\frac{\Delta\omega\_i}{x\_lim\_i}\right)^2 \qquad (1)$$

where
- I_t_i: an inertia moment or an inertial mass in a case of displacing the i-th joint mechanism in the case where the movable part collides with the object;
- Δω_i: a relative displacement speed of the i-th joint mechanism determined by the relative displacement speed determination unit; and
- x_lim_i: a maximum deformation amount of the elastic element of the i-th joint mechanism.

3. The control device for the link mechanism according to claim 1, wherein, with an arbitrary joint mechanism among the one or more joint mechanisms defined as the i-th joint mechanism, the characteristic determination unit determines the second stiffness of the elastic element of the i-th joint mechanism so as to be equal to or less than stiffness obtained according to the following expression (2):

[MATH. 2]

$$I\_t\_i \cdot \left( \frac{\pi \cdot A\_max\_i}{2 \cdot \Delta\omega\_i} \right)^2 \qquad (2)$$

where
- I_t_i: an inertia moment or an inertial mass in a case of displacing the i-th joint mechanism in the case where the movable part collides with the object;
- π: circular constant;
- A_max_i: maximum acceleration achievable in the i-th joint mechanism in the case of displacing the i-th joint mechanism by using the actuator; and
- Δω_i: a relative displacement speed of the i-th joint mechanism determined by the relative displacement speed determination unit.

4. The control device for the link mechanism according to claim 1, wherein the characteristic determination unit determines the stiffness of the elastic element smaller as the joint mechanism is closer to the movable part.

5. The control device for the link mechanism according to claim 1, wherein:
assuming that, in a case of existence of a marginal joint mechanism which is a joint mechanism in which the first stiffness is greater than the second stiffness among the one or more joint mechanisms, the stiffness of the elastic element of the marginal joint mechanism is equal to the second stiffness when the characteristic determination unit determines the first stiffness and the second stiffness of each of the one or more joint mechanisms, the relative displacement speed determination unit redetermines a change amount in displacement speed of the marginal joint mechanism in the case of displacing the marginal joint mechanism at a maximum acceleration achievable in the marginal joint mechanism by using the actuator, during a time period from a time point of starting the displacement of the marginal joint mechanism caused by the collision of the movable part against the object to a time point of starting the displacement of the marginal joint mechanism caused by the elastic energy of the elastic element of the marginal joint mechanism accumulated by the displacement of the marginal joint mechanism caused by the collision, as a relative displacement speed of the marginal joint mechanism and redetermines the relative displacement speed of the joint mechanism so as to be higher than the currently-determined relative displacement speed of the joint mechanism in each of the joint mechanisms other than the marginal joint mechanism among the one or more joint mechanisms; and
the characteristic determination unit redetermines the first stiffness and the second stiffness based on the displacement speed redetermined by the relative displacement speed determination unit in each of the one or more joint mechanisms.

6. The control device for the link mechanism according to claim 5, wherein the characteristic determination unit redetermines the stiffness of the elastic element of the joint mechanism other than the marginal joint mechanism among the one or more joint mechanisms so that the stiffness of the elastic element of the joint mechanism closer to the movable part than the marginal joint mechanism is smaller than the stiffness of the elastic element of the joint mechanism closer to the base body than the marginal joint mechanism.

7. The control device for the link mechanism according to claim 1, wherein:
each of the one or more joint mechanisms is configured to transmit motive power via the elastic element and a viscous element having a viscous coefficient adapted to be variably controllable by the characteristic control unit;
the characteristic determination unit determines the viscosity coefficient of the viscous element of the joint mechanism appropriate to the determined stiffness so that the behavior characteristic of the joint mechanism is a critical damping or overdamping characteristic when determining the stiffness of the elastic element of the joint mechanism in each of the one or more joint mechanisms; and
the characteristic control unit controls the viscous coefficient of the viscous element of the joint mechanism so as to be the viscous coefficient determined by the characteristic determination unit in each of the one or more joint mechanisms.

\* \* \* \* \*